(12) United States Patent
Frock et al.

(10) Patent No.: US 11,154,162 B2
(45) Date of Patent: Oct. 26, 2021

(54) COOKING APPLIANCE AND RELATED HEATER ASSEMBLY

(71) Applicant: ILLINOIS TOOL WORKS INC., Glenview, IL (US)

(72) Inventors: Jeffrey L. Frock, Troy, OH (US); Timothy L. Cupp, Hillsboro, OH (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 477 days.

(21) Appl. No.: 15/913,324

(22) Filed: Mar. 6, 2018

(65) Prior Publication Data

US 2018/0263413 A1    Sep. 20, 2018

Related U.S. Application Data

(60) Provisional application No. 62/471,102, filed on Mar. 14, 2017.

(51) Int. Cl.
*H05B 3/68* (2006.01)
*A47J 37/06* (2006.01)
*A47J 37/10* (2006.01)

(52) U.S. Cl.
CPC ......... *A47J 37/0676* (2013.01); *A47J 37/105* (2013.01)

(58) Field of Classification Search
CPC ....... A47J 37/06; A47J 37/0676; A47J 37/105
USPC ............................ 219/443.1–468.2, 520–525
See application file for complete search history.

(56) References Cited

U.S. PATENT DOCUMENTS

| 1,664,324 | A | | 3/1928 | Schell | |
|---|---|---|---|---|---|
| 2,428,900 | A | * | 10/1947 | Wiegand | H05B 3/48 29/614 |
| 2,875,312 | A | | 2/1959 | Norton | |
| 2,938,989 | A | * | 5/1960 | Smith | H05B 3/76 219/454.12 |
| 2,942,562 | A | | 6/1960 | Luc | |
| 2,955,186 | A | | 10/1960 | Ritter | |
| 2,987,300 | A | | 6/1961 | Greene | |
| 3,364,844 | A | | 1/1968 | Felske | |
| 3,493,723 | A | | 2/1970 | Popeil | |
| 3,521,032 | A | | 7/1970 | Valentin | |
| 3,610,133 | A | | 10/1971 | Mies | |
| 3,681,568 | A | * | 8/1972 | Schaefer | A47J 27/004 219/432 |
| 3,885,128 | A | * | 5/1975 | Dills | F24C 15/105 219/455.12 |
| 4,045,653 | A | * | 8/1977 | Soper | A47J 37/105 219/438 |
| 4,301,717 | A | | 11/1981 | Knees | |
| 4,314,401 | A | * | 2/1982 | Saku | H05B 3/48 29/611 |

(Continued)

*Primary Examiner* — Sang Y Paik
(74) *Attorney, Agent, or Firm* — Thompson Hine LLP

(57) ABSTRACT

A cooking appliance includes a housing, a cooking area or volume on or in the housing and a heater assembly for heating the cooking area or volume. The heater assembly includes a heater plate body with a surface having at least one groove therein. The groove includes both a deformable metal sheet element and a resistive heater element therein. The deformable metal sheet element is pressed between an outer surface portion of the resistive heater element and a surface portion of the groove to provide a thermal transfer path from the resistive heating element and to the heater plate body through the deformable metal sheet element.

19 Claims, 9 Drawing Sheets

(56) References Cited

U.S. PATENT DOCUMENTS

| | | | |
|---|---|---|---|
| 4,506,251 A * | 3/1985 | Naruo | H05B 3/48 |
| | | | 219/544 |
| 4,509,412 A | 4/1985 | Whittenburg | |
| 4,729,296 A | 3/1988 | Sabin | |
| 5,355,779 A * | 10/1994 | O'Brien | A47J 37/0694 |
| | | | 99/446 |
| 5,553,531 A | 9/1996 | Brown | |
| 5,865,101 A | 2/1999 | Brown | |
| 5,964,145 A | 10/1999 | Brown | |
| 6,097,004 A * | 8/2000 | Seul | H05B 3/686 |
| | | | 219/438 |
| 6,371,357 B1 | 4/2002 | Watanabe | |
| 6,376,815 B1 | 4/2002 | Watanabe | |
| 6,552,311 B2 | 4/2003 | Watanabe | |
| 6,557,747 B2 | 5/2003 | Watanabe | |
| 6,582,743 B2 | 6/2003 | Cai | |
| 6,602,530 B1 | 8/2003 | Weber | |
| 6,799,735 B2 | 10/2004 | Watanabe | |
| 6,919,542 B2 * | 7/2005 | Galliou | H05B 3/48 |
| | | | 219/468.2 |
| 7,150,418 B2 | 12/2006 | Watanabe | |
| 7,154,070 B2 | 12/2006 | Watanabe | |
| 7,412,922 B2 | 8/2008 | McLemore | |
| 7,853,130 B2 | 12/2010 | Frock | |
| 8,263,908 B2 | 9/2012 | Watanabe | |
| 8,354,620 B2 | 1/2013 | Frock | |
| 2004/0149719 A1 * | 8/2004 | Nakamura | H01L 21/67103 |
| | | | 219/444.1 |
| 2004/0226934 A1 | 11/2004 | Moore | |
| 2005/0034611 A1 | 2/2005 | McLemore | |
| 2008/0008807 A1 | 1/2008 | Frock | |
| 2009/0087534 A1 | 4/2009 | McLemore | |
| 2009/0095166 A1 | 4/2009 | Jian | |
| 2011/0049123 A1 | 3/2011 | Frock | |
| 2011/0303651 A1 | 12/2011 | Mineoka | |

* cited by examiner

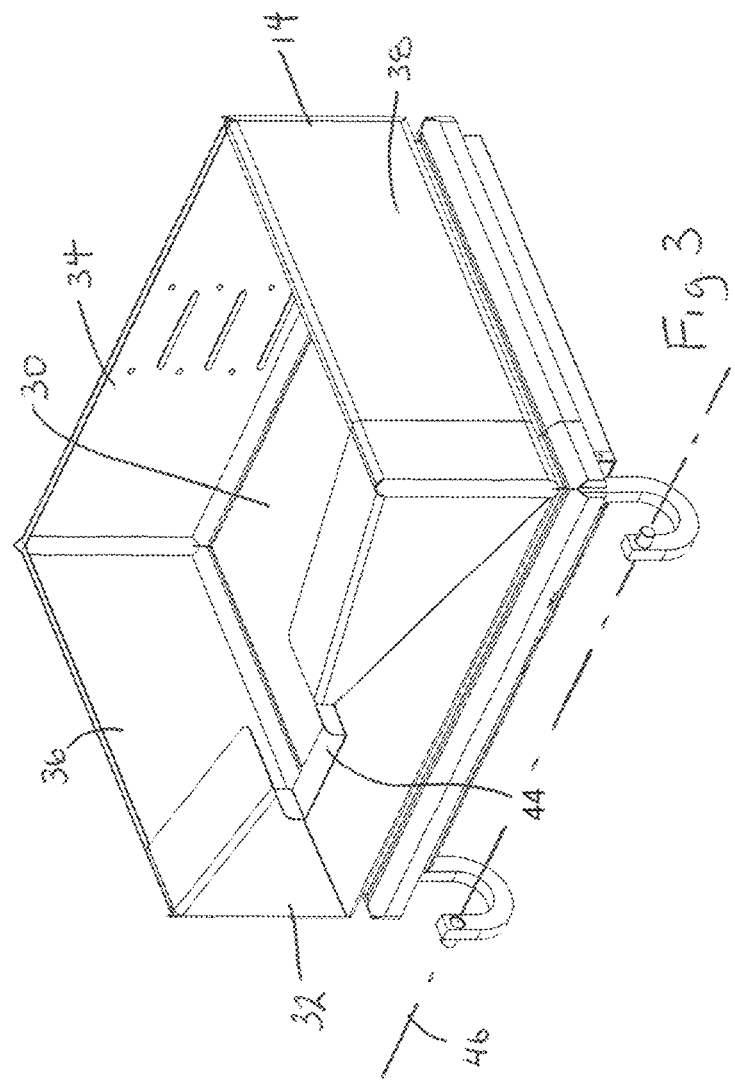

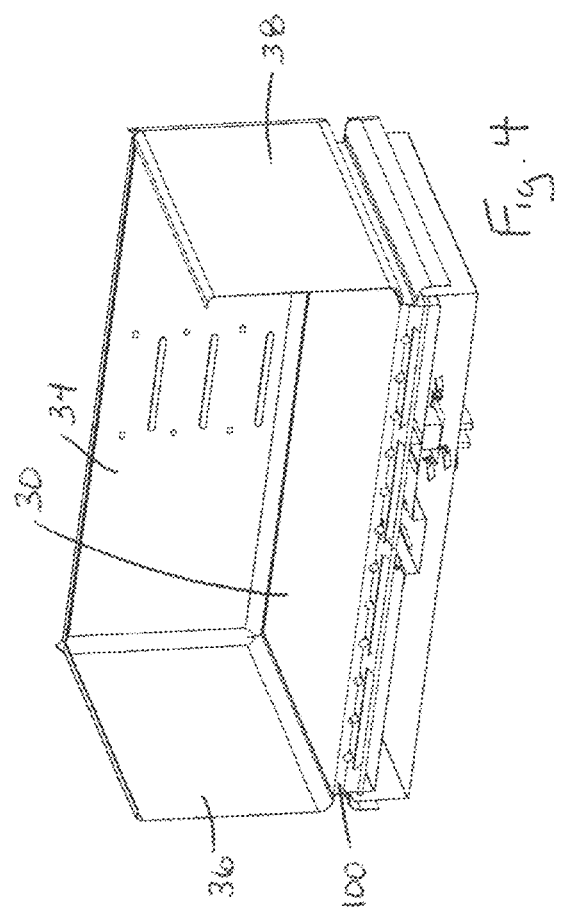

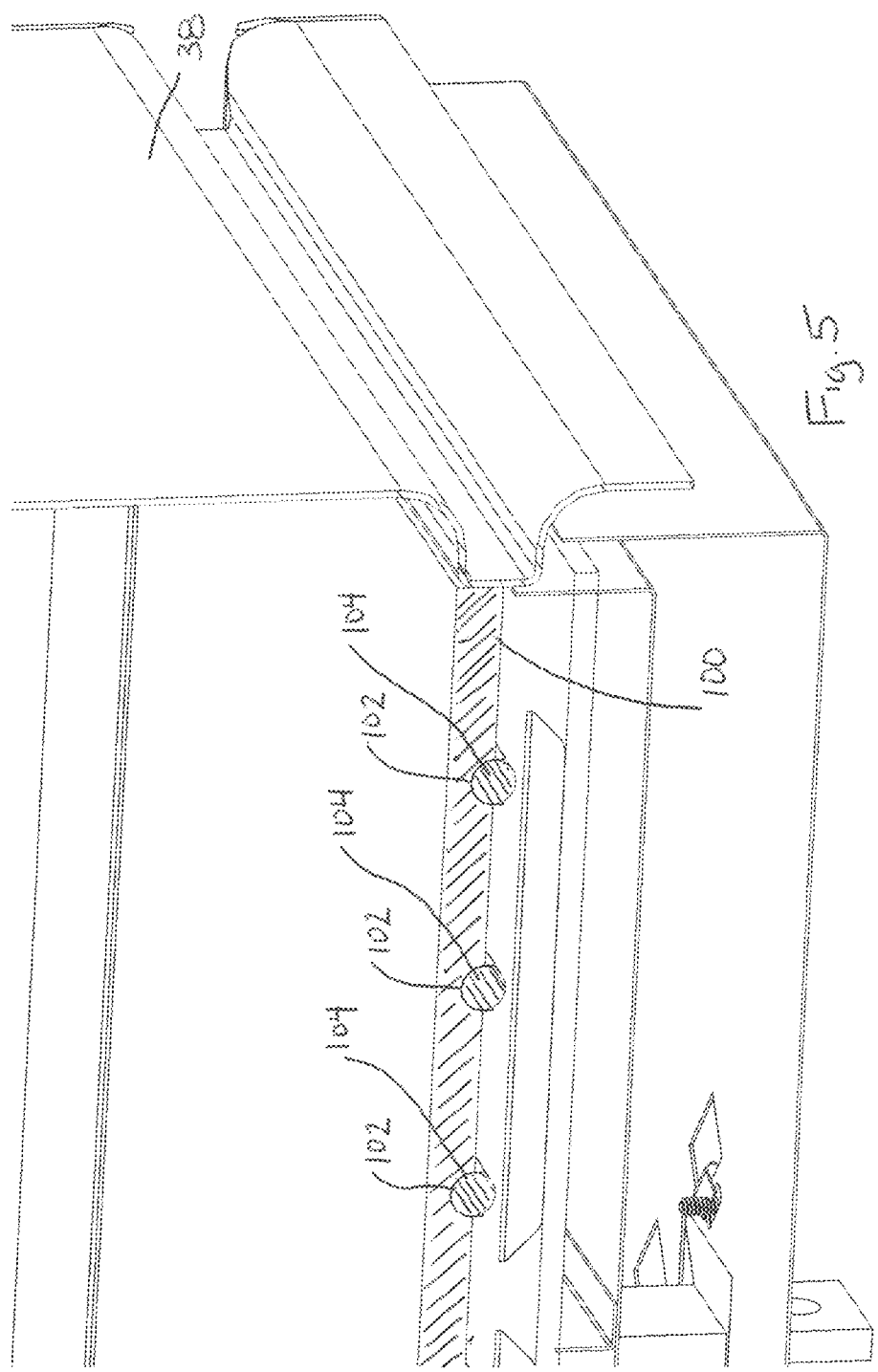

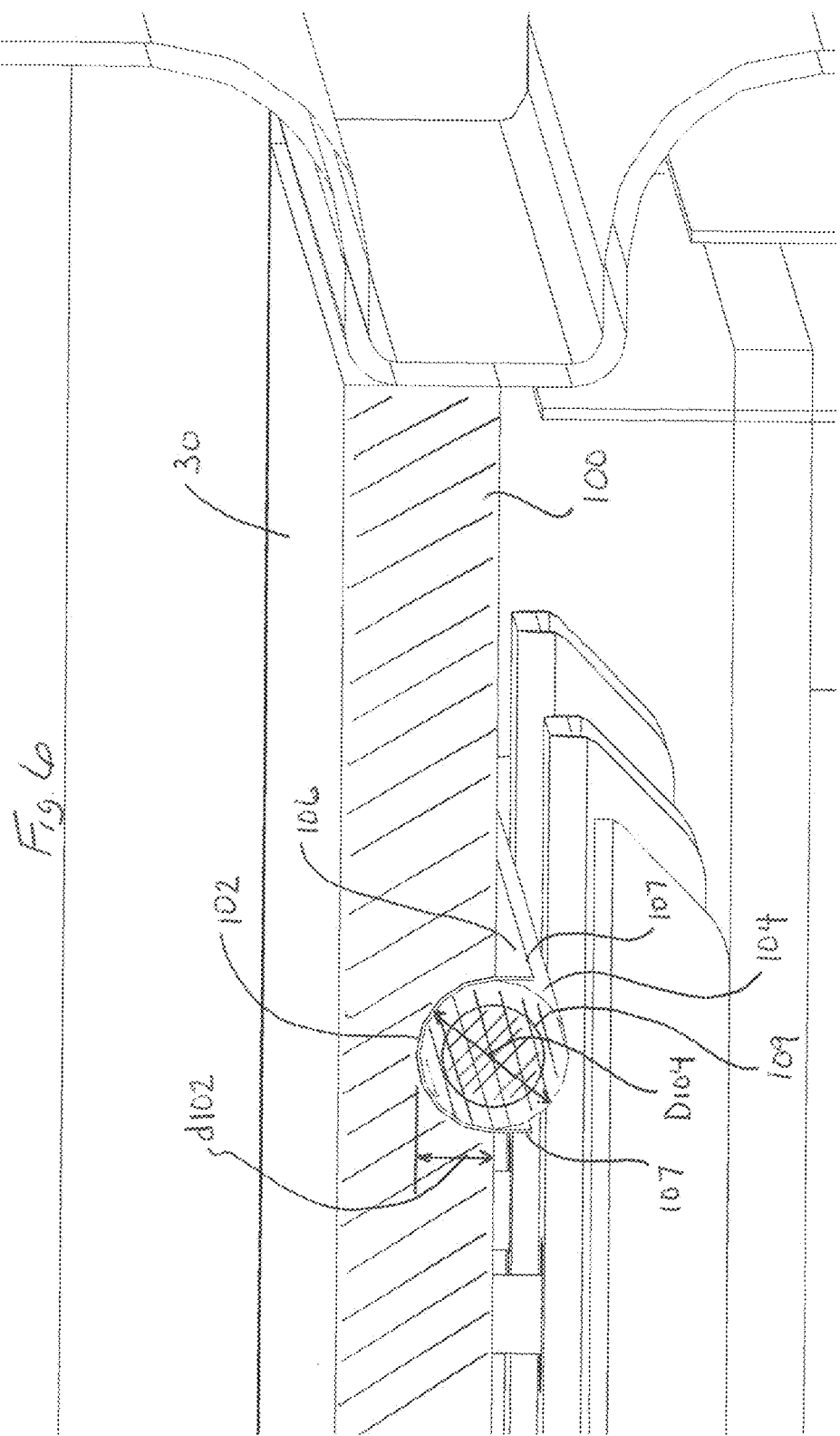

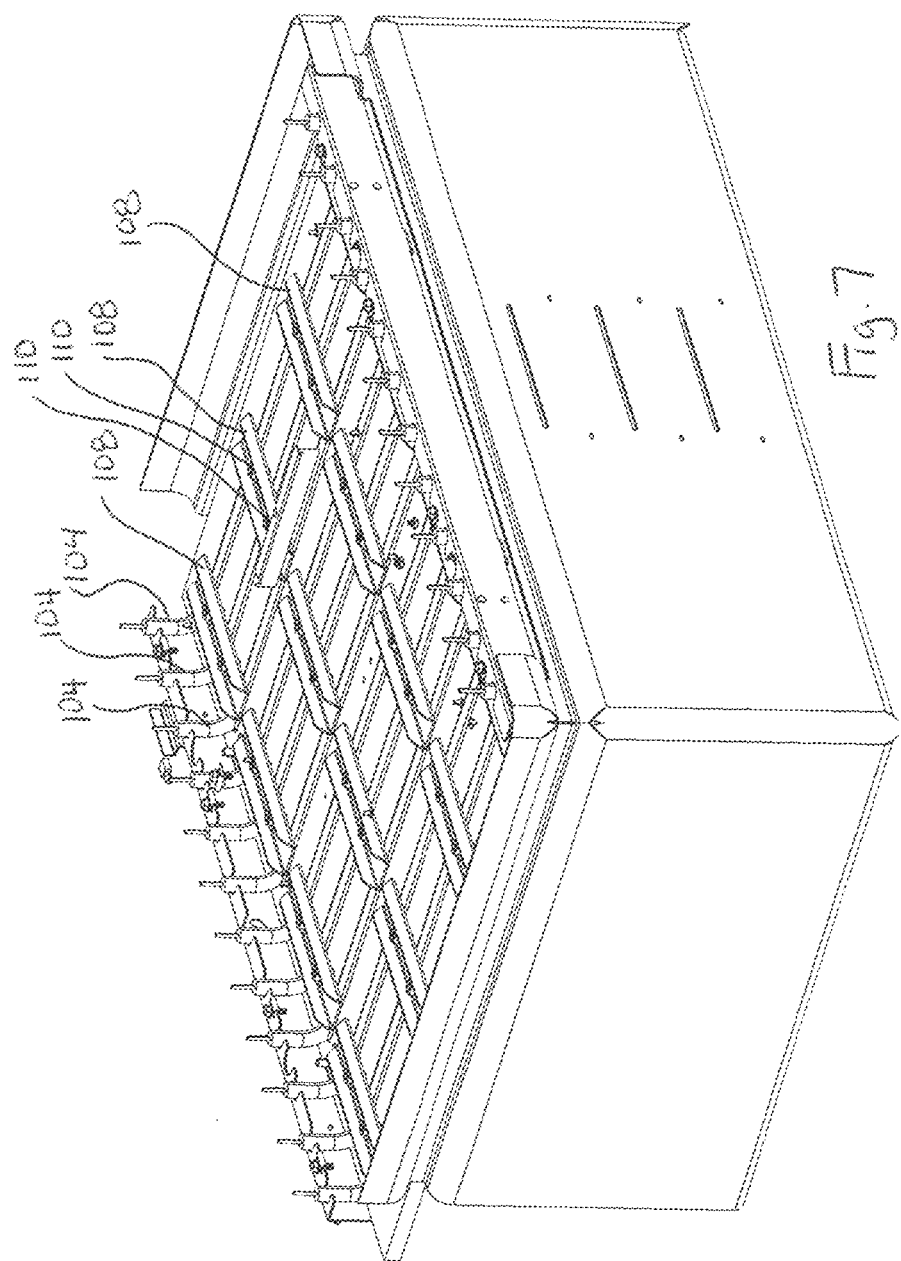

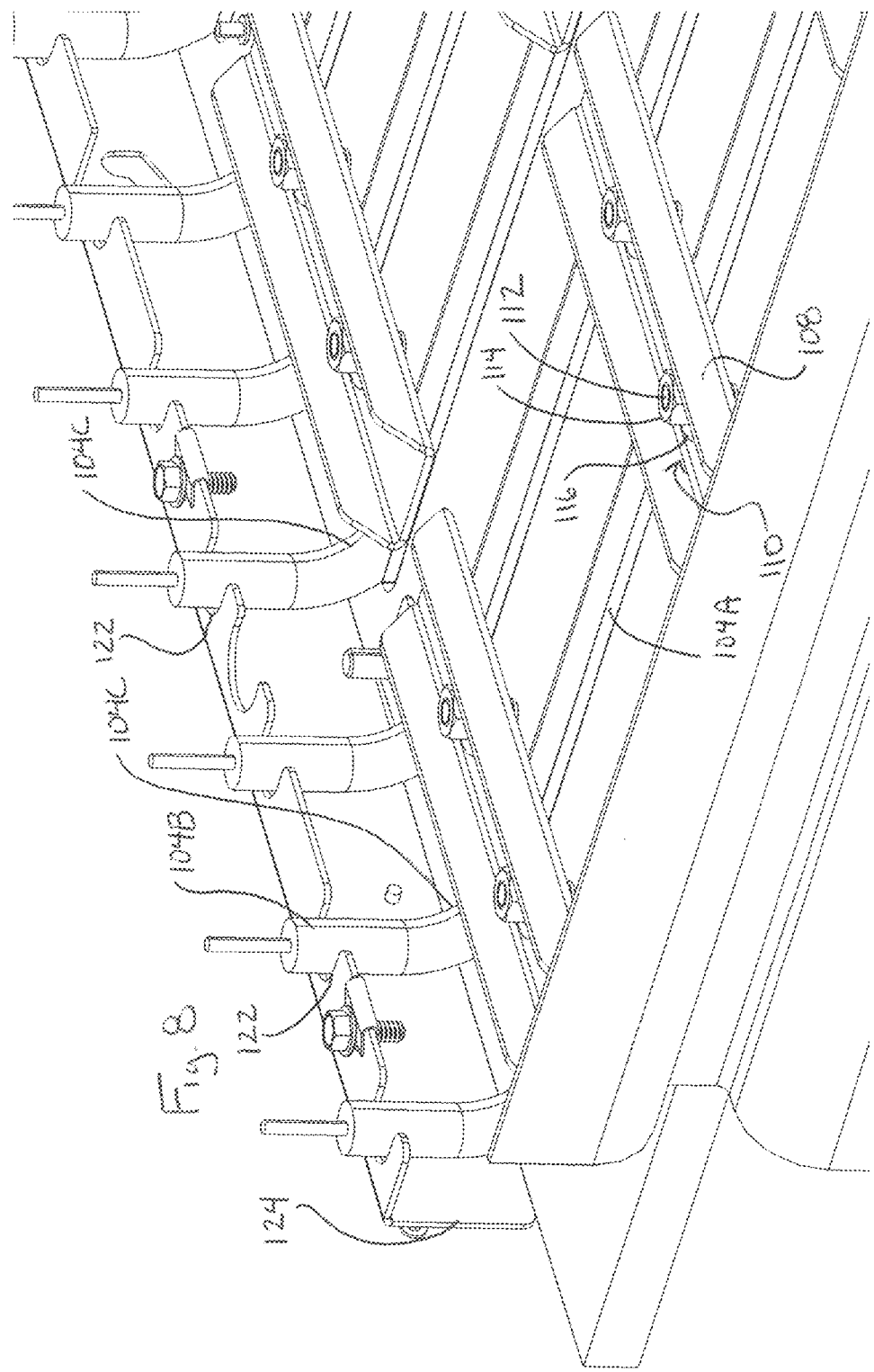

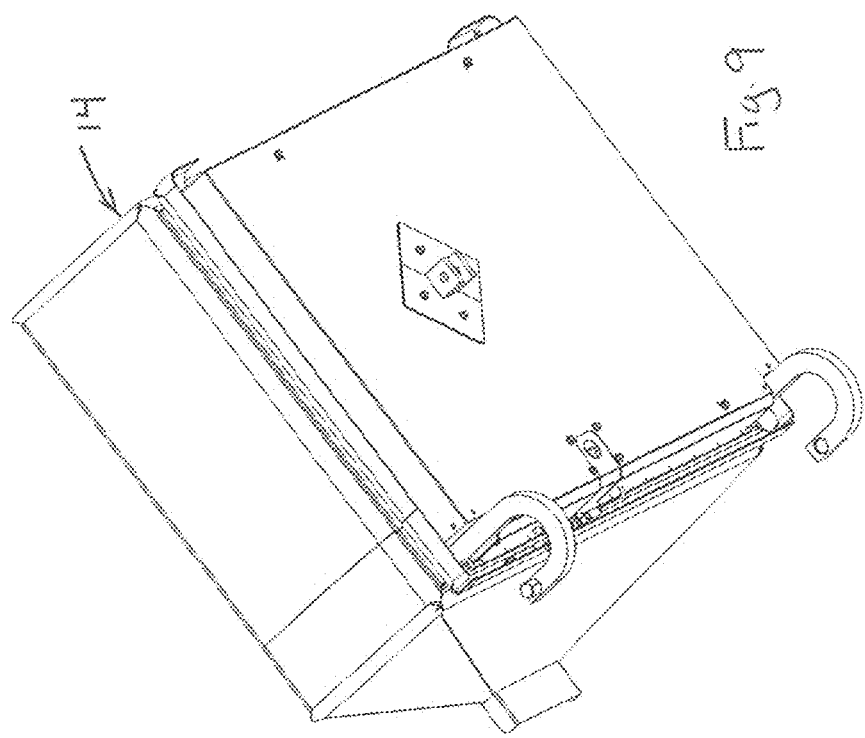

COOKING APPLIANCE AND RELATED HEATER ASSEMBLY

CROSS-REFERENCES

This application claims the benefit of U.S. Provisional Application No. 62/471,102, filed Mar. 14, 2017, which is incorporated herein by reference.

TECHNICAL FIELD

This application relates generally to commercial kitchen cooking appliances with plate-type heaters and, more specifically, to a cooking appliance, such as a braising pan or griddle, with a heater plate assembly.

BACKGROUND

A typical braising pan includes a cooking vessel with a bottom cooking wall that must be heated. Other cooking appliances also include cooking walls that must be heated. In such cases, a heater plate may form the cooking wall, or may be positioned against one side of the cooking wall, for heating purposes, where the heater plate is heated by multiple resistive heating elements. Heater plates with embedded heating elements are known, but expensive, particularly from a maintenance or replacement standpoint. In cases where the resistive heating elements are not embedded within the plate, assuring effective thermal transfer from the elements to the plate body can be an issue.

It would be desirable to provide a braising pan, or similar kitchen appliance, with a plate-type heater assembly that utilizes heating elements arranged to provide effective heat transfer to the plate.

SUMMARY

In one aspect, a cooking appliance includes a heater assembly at the underside of a cooking wall. The heater assembly includes at least one groove with a resistive heater element seated therein. A deformable metal sheet element is pressed between an outer surface portion of the resistive heater element and a surface portion of the groove to provide effective thermal transfer from the resistive heating element, through the metal sheet element and to the heater plate.

In another aspect, a cooking appliance includes a housing, a cooking area or volume on or in the housing and a heater assembly for heating the cooking area or volume. The heater assembly includes a heater plate body with a surface having at least one groove therein. The groove includes both a deformable metal sheet element and a resistive heater element therein. The deformable metal sheet element is pressed between an outer surface portion of the resistive heater element and a surface portion of the groove to provide a thermal transfer path from the resistive heating element and to the heater plate body through the deformable metal sheet element.

In a further aspect, a cooking appliance includes a housing, at least one upwardly facing cooking wall for cooking and a heater assembly at the underside of the cooking wall. The heater assembly includes a heater plate body with a surface having a plurality of elongated grooves therein. A multiplicity of the elongated grooves each include a copper sheet element and an elongated resistive heater element therein, where the copper sheet element is pressed between an outer surface portion of the elongated resistive heater element and a surface portion of the elongated groove to provide a thermal transfer path from the elongated resistive heating element to the heater plate body through the copper sheet element.

In yet another aspect, a cooking appliance includes a cooking surface and a heater assembly for heating the cooking surface. The heater assembly includes a heater plate body with a surface having at least one groove therein. The groove includes both a deformable metal sheet element and a resistive heater element therein. The deformable metal sheet element is pressed between an outer surface portion of the resistive heater element and a surface portion of the groove to provide a thermal transfer path from the resistive heating element and to the heater plate body through the deformable metal sheet element. The deformable metal sheet element has a thickness of between about 5 mil and about 20 mil, and at least one clamp element presses the resistive heating element into the groove and against the deformable metal sheet element.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 3 shows a perspective view of a vessel portion of the braising pan;

FIG. 4 shows a cross-section of the vessel;

FIGS. 5 and 6 show enlarged views of portions of the cross-section;

FIG. 7 shows a bottom perspective view of the vessel with the heater assembly uncovered;

FIG. 8 shows an enlarged view of a portion of FIG. 7; and

FIG. 9 shows bottom perspective view of the vessel with the heater assembly covered.

DETAILED DESCRIPTION

Figure 1:
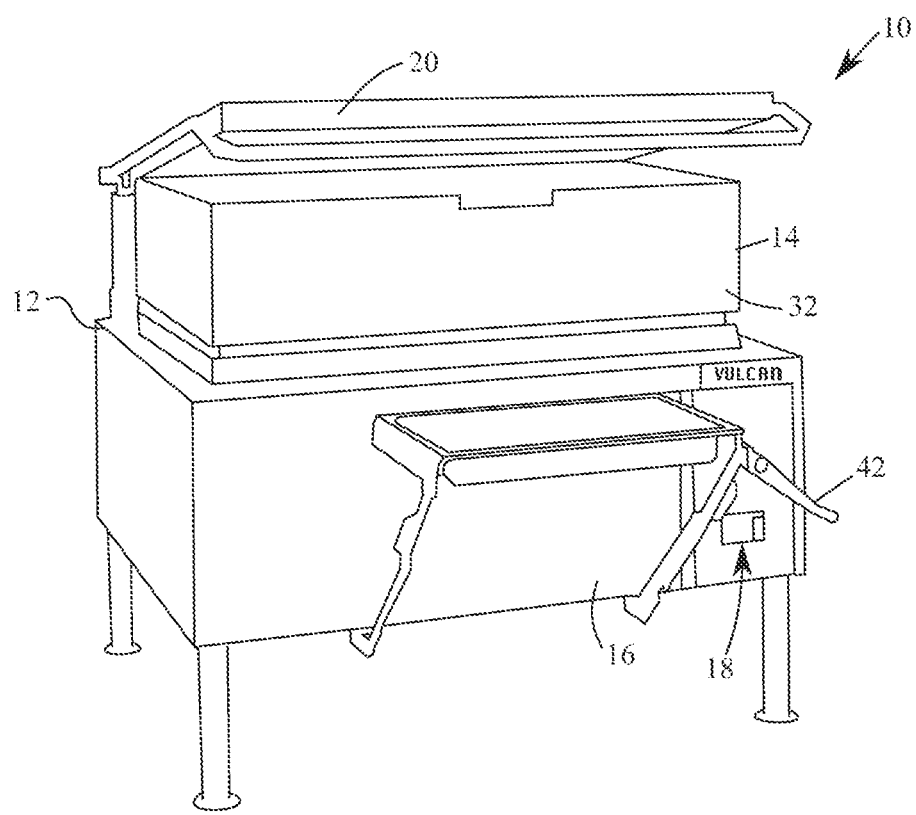
FIG. 1 shows a perspective view of an exemplary cooking appliance in the form of a braising pan unit.
Figure 2:
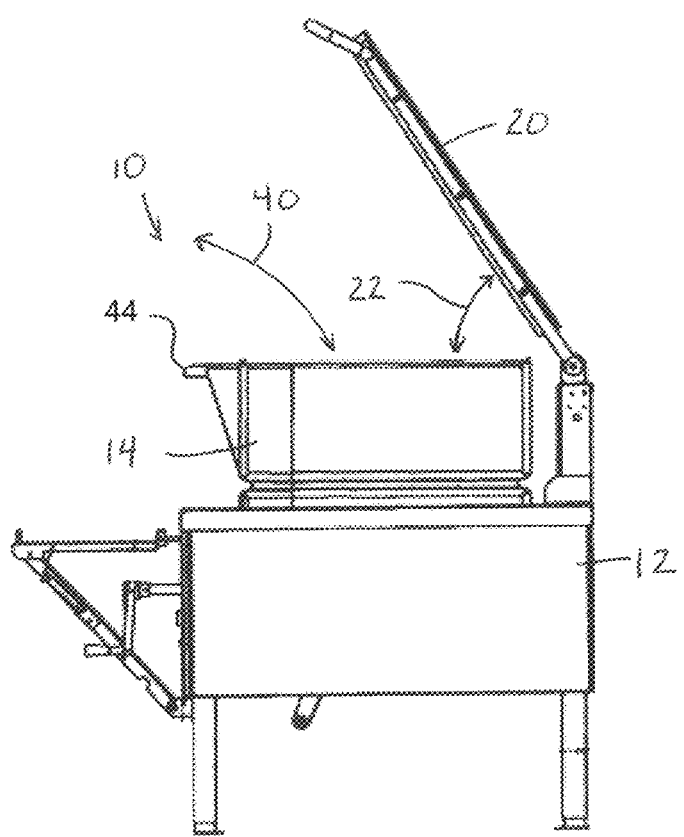
FIG. 2 shows a side elevation view of the braising pan unit with lid raised.

Referring to FIGS. 1-3, a commercial cooking appliance, in the form of a braising pan unit 10 is shown, and includes a housing 12 that supports a vessel 14 for cooking. The housing (e.g., typically of metal frame and panel construction) includes a front side 16 with one or more controls 18 (e.g., knobs) and a back side (e.g., typically positioned alongside a wall when in use). The vessel 14 includes a bottom cooking wall 30 and front 32, back 34, left 36 and right 38 side walls extending upwardly from the bottom wall. Thus, the vessel provides a cooking surface area (e.g., the surface of the cooking wall 30) and also provides a cooking volume (e.g., define by the depth of the walls rising from the cooking wall). A lid 20 is pivotable, per arrow 22 in FIG. 2, between a position covering the vessel and a position raised to provide access to the vessel. The vessel 14 may also be pivotable, per arrow 40, about a forward pivot axis 46 to permit pouring of material from the vessel. A mechanical crank 42 and linkage, or alternatively a powered assembly, may be provided for such purpose, and the front wall of the vessel may include a pouring spout 44 formed therein.

FIGS. 4-6 show an exemplary heater plate assembly useful in connection with a braising pan or similar cooking surface. In this embodiment the heater assembly includes a heater plate 100 with a top side or surface and a bottom side or surface, with a plurality of elongated grooves or recesses 102 formed in the bottom side of the heater plate body. The top side of the heater plate body actually forms the cooking surface, and thus, in the illustrated embodiment, the heater plate body forms the cooking wall 30. However, in other embodiments the heater plate body could be positioned adjacent the underside of the cooking wall. Elongated resistive heating elements 104 are positioned within each of the grooves 102. In order to assure good thermal contact and thus to facilitate heat transfer from the elements 104 to the plate 100, thin, deformable metal inserts 106 are disposed in the grooves 102 and conform to the groove shape and/or heating element shape when the heating elements are pressed into the grooves.

In one example, the inserts are of copper material and have a thickness of between 5 and 20 mils, such as between 8 and 15 mils, but other variations are possible. Copper may be preferred because of its high thermal conductivity, but it is recognized that alternative metal materials might be used, such as aluminum or brass. The copper inserts 106 provide for a sound and consistent thermally conductive path between the heating elements 104 and the plate 100, through the inserts, even if the surface shape of the heating elements 104 does not match precisely to the surface shape of the grooves 102. As seen in FIG. 6, effective thermal contact may be best assured when the copper inserts 106 are sized so as to be large enough to be in contact with the entirety of the plate body surface portion that defines the groove 102, with end portions 107 extending out of the groove 102. By way of example, over 80% (e.g., over 90% or even over 95%) of the total conductive heat transfer from the resistive heating elements to the plate body is through the copper sheet elements.

The groove, heating element and copper insert assembly allows for more effective heat transfer from the heating element to the heater plate, particularly in cases where the groove dimension (e.g., radius of a substantially arcuate surface portion of the groove) is slightly larger than the heating element dimension (e.g., radius of substantially circular cross-sectional shape of the element). The manufacturing tolerance for the heating plate, and in particular the size and shape of the grooves of the plate, can therefore be larger, reducing production costs. In one embodiment, a depth of each groove 102, designated d102 in FIG. 6, may be between about 30% and about 70% (e.g., between about 40% and about 60%) of a diameter of the heating element 104, such diameter designated D104. The illustrated heating element has a substantially circular transverse cross-section, as does the electrically conductive internal portion 109 of the element.

Referring to FIGS. 7-8, in the illustrated embodiment, the heating elements 104 are arranged in sets of three, which each set held in place at the underside of the plate by a plurality of clamp straps or brackets 108 that are secured to the plate by fasteners 110. Here, the fasteners take the form of threaded studs 112 that extend from the back side of the plate and that are engaged by nuts 114 and corresponding spring washers 116. The clamp straps 108 are secured to the heater plate and thus press each elongated resistive heating element 104 into its respective elongated groove. Thus, each of the deformable copper sheet elements is pressed between an outer surface portion of the resistive heater element and a surface portion of the groove to provide the desired thermal transfer path.

In the illustrated embodiment, each resistive heating element 104 includes a main, elongated body portion 104A in the groove and end portion 104B extending out of the groove, with a bend 104C connecting the main body portion 104A and the end portions 104B. The end portions 104B are engaged in respective openings 122 formed in end brackets or clamps 124, which may be mounted to the heater plate body. The openings 122 limit potential rotation of the resistive heating elements 104 about the elongated axes of the main body portion of the heating elements and thus limit potential rotation of the heating element portion in the groove (e.g., limit rotation of the elongated resistive heating elements before the clamp straps are installed). In the illustrated embodiment, the openings 122 are formed as slots with open ends. The end portions 104B of the elements provide terminal connections for application of power.

As shown in FIG. 9, the heater assembly formed by the heater plate, metal sheet elements, resistive heater elements, straps and brackets etc. may be covered when the appliance is fully assembled (e.g., by heater box inner and outer covers).

It is to be clearly understood that the above description is intended by way of illustration and example only, is not intended to be taken by way of limitation, and that other changes and modifications are possible. For example, while a cooking appliance in the form of a braising pan unit is primarily described, the cooking appliance could be in some other form, such as a griddle or an oven, or any other cooking appliance that incorporated a heating plate heated by resistive heating elements. Moreover, while a configuration in which both the plate grooves and heating element portions seated therein are elongated and linear, it is recognized that some or all portions of the grooves and heating element portions seated therein could curve (e.g., in the case of circular, U-shaped or S-shaped resistive heating elements). Other modifications are possible.

What is claimed is:

1. A cooking appliance, comprising:
   a housing;
   a cooking area or volume on or in the housing;
   a heater assembly for heating the cooking area or volume, the heater assembly comprising:
   a heater plate body with a surface having at least one groove therein, wherein the groove includes both a deformable metal sheet element and a resistive heater element therein, wherein the resistive heater element includes an electrically conductive internal portion surrounded by an external portion that defines an outer surface portion of the resistive heater element, wherein the deformable metal sheet element is separate from the external portion of the resistive heater element and is pressed between the outer surface portion of the resistive heater element and a surface portion of the groove to provide a thermal transfer path from the resistive heating element and to the heater plate body through the deformable metal sheet element.

2. The cooking appliance of claim 1 wherein the deformable metal sheet element has a thickness of between 5 mil and 20 mil.

3. The cooking appliance of claim 2 wherein the deformable metal sheet element has a thickness of between 8 mil and 15 mil.

4. The cooking appliance of claim 1 wherein the resistive heating element is substantially circular in transverse cross-section and the surface portion of the groove is substantially arcuate.

5. The cooking appliance of claim 4 wherein a depth of the groove is between 30% and 70% of a diameter of the substantially circular transverse cross-section.

6. The cooking appliance of claim 5 wherein the depth of the groove is between 40% and 60% of the diameter.

7. The cooking appliance of claim 4 wherein a radius of the substantially arcuate surface portion of the groove is larger than a radius of the substantially circular transverse cross-section of the resistive heating element.

8. The cooking appliance of claim 1 wherein at least one clamp element presses the resistive heating element into its respective groove and against the deformable metal sheet element therein.

9. The cooking appliance of claim 1 wherein the resistive heating element includes an elongated main body portion having an elongated axis in the groove and at least one end portion extending out of the groove, with a bend connecting the elongated main body portion and the end portion, wherein the end portion is engaged in an opening formed in a bracket mounted to the heater plate body, such that the opening limits rotation of the resistive heating element about the elongated axis.

10. The cooking appliance of claim 1 wherein the deformable metal sheet element is a copper sheet element.

11. A cooking appliance, comprising:
a housing;
at least one upwardly facing cooking wall for cooking;
a heater assembly at the underside of the cooking wall, the heater assembly comprising:
a heater plate body with a surface having a plurality of elongated grooves therein, wherein a multiplicity of the elongated grooves each include a copper sheet element and an elongated resistive heater element therein, wherein the elongated resistive heater element includes an electrically conductive internal portion surrounded by an external portion, wherein the copper sheet element is separate from the external portion of the elongated resistive heater element and is pressed between an outer surface portion of the external portion of the elongated resistive heater element and a surface portion of the elongated groove to provide a thermal transfer path from the elongated resistive heating element to the heater plate body through the copper sheet element; and
wherein one or more clamp straps secured to the heater plate body press each elongated resistive heating element into its respective elongated groove.

12. The cooking appliance of claim 11 wherein each copper sheet element has a thickness of between 5 mil and 20 mil.

13. The cooking appliance of claim 11 wherein end portions of each elongated resistive heating element are turned and extend away from an elongated axis of the groove in which the elongated resistive heating element is located.

14. The cooking appliance of claim 13 wherein the end portions are seated in openings formed inside brackets mounted to the heater plate body, such that the openings limit rotation of the elongated resistive heating elements in the grooves about their elongated axes.

15. The cooking appliance of claim 14 wherein the openings in the side brackets are formed as open-ended slots.

16. The cooking appliance of claim 11 wherein the heater plate body is positioned adjacent the underside of the cooking wall.

17. The cooking appliance of claim 11 wherein the heater plate body forms the cooking wall.

18. A cooking appliance, comprising:
a cooking surface;
a heater assembly for heating the cooking surface, the heater assembly comprising:
a heater plate body with a surface having at least one groove therein, wherein the groove includes both a deformable copper sheet element and a resistive heater element therein, wherein the resistive heater element includes an electrically conductive internal portion surrounded by an external portion that defines an outer surface portion of the resistive heater element, wherein the deformable copper sheet element is separate from the external portion of the resistive heater element and is pressed between the outer surface portion of the resistive heater element and a surface portion of the groove to provide a thermal transfer path from the resistive heating element and to the heater plate body through the deformable copper sheet element, wherein the deformable copper sheet element has a thickness of between 5 mil and 20 mil; and
at least one clamp element pressing the resistive heating element into the groove and against the deformable copper sheet element.

19. The cooking appliance of claim 18 wherein the cooking surface is one surface of the heater plate body.

* * * * *